United States Patent
Hassaan et al.

(10) Patent No.: US 11,868,809 B2
(45) Date of Patent: Jan. 9, 2024

(54) HARDWARE ASSISTED FINE-GRAINED DATA MOVEMENT

(71) Applicant: ADVANCED MICRO DEVICES, INC., Santa Clara, CA (US)

(72) Inventors: Muhammad Amber Hassaan, Austin, TX (US); Anirudh Mohan Kaushik, Austin, TX (US); Sooraj Puthoor, Austin, TX (US); Gokul Subramanian Ravi, Austin, TX (US); Bradford Beckmann, Bellevue, WA (US); Ashwin Aji, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/095,704

(22) Filed: Jan. 11, 2023

(65) Prior Publication Data
US 2023/0229494 A1 Jul. 20, 2023

Related U.S. Application Data

(62) Division of application No. 16/824,601, filed on Mar. 19, 2020, now Pat. No. 11,734,059.

(51) Int. Cl.
G06F 9/46 (2006.01)
G06F 9/48 (2006.01)
G06F 9/52 (2006.01)
G06F 16/901 (2019.01)

(52) U.S. Cl.
CPC .............. G06F 9/4881 (2013.01); G06F 9/52 (2013.01); G06F 16/9024 (2019.01); *G06F 2209/486* (2013.01)

(58) Field of Classification Search
CPC ...... G06F 9/4881; G06F 16/9024; G06F 9/52; G06F 2209/486
See application file for complete search history.

*Primary Examiner* — Gregory A Kessler

(57) ABSTRACT

A processor includes a task scheduling unit and a compute unit coupled to the task scheduling unit. The task scheduling unit performs a task dependency assessment of a task dependency graph and task data requirements that correspond to each task of the plurality of tasks. Based on the task dependency assessment, the task scheduling unit schedules a first task of the plurality of tasks and a second proxy object of a plurality of proxy objects specified by the task data requirements such that a memory transfer of the second proxy object of the plurality of proxy objects occurs while the first task is being executed.

20 Claims, 8 Drawing Sheets

| TASK ID | EXECUTION TIME | TASK DATA REQUIREMENTS | | |
|---|---|---|---|---|
| 1 | 4 | A[0:7] | | |
| 2 | 6 | A[0:7] | B[0:7] | |
| 3 | 6 | A[0:7] | B[8:15] | |
| 4 | 3 | A[0:7] | B[0:7] | C [0:7] |
| 5 | 1 | A[0:7] | B[0:7] | C[8:15] |
| 6 | 3 | A[0:7] | B[8:15] | C[16:23] |
| 7 | 1 | A[0:7] | B[8:15] | C[24:31] |
| 8 | 8 | A[8:15] | B[16:23] | C [0:7] |
| 9 | 8 | A[8:15] | B[24:31] | C[8:15] |
| 10 | 10 | A[16:31] | B[24:31] | C[24:31] |

FIG. 3

HARDWARE ASSISTED FINE-GRAINED DATA MOVEMENT

CROSS-REFERENCE TO RELATED APPLICATIONS

The present application is a Divisional application of U.S. patent application Ser. No. 16/824,601, entitled "HARDWARE ASSISTED FINE-GRAINED DATA MOVEMENT", and filed on Mar. 19, 2020, the entirety of which is incorporated by reference herein.

STATEMENT REGARDING FEDERALLY SPONSORED RESEARCH OR DEVELOPMENT

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Memory management techniques that are used in data processing systems to transfer data structures from graphical processing units (GPUs) to central processing units (CPUs) affect application performance. Traditionally, programmers copy the entire data structures to GPU memory outright, execute compute kernels that manipulate the data structures, and copy the data structures back to the host CPU. The time spent copying data from CPU memory to GPU memory and vice versa can significantly impact processing overhead, as the memory bandwidth provided by the interconnect between the CPU and the GPU is significantly slower than the GPU memory bandwidth available to the GPU compute cores.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 is a tasks-to-data-requirements mapping used for task-to-proxy-object scheduling in the processing system of FIG. 1 in accordance with some embodiments.

DETAILED DESCRIPTION

FIGS. 1-9 illustrate systems, mappings, and techniques for asynchronously scheduling tasks and proxy objects in a graphics processing unit (GPU). A task scheduling unit schedules tasks and the transfer of data blocks using a task-to-proxy-object scheduling technique that schedules the tasks such that the transfer of proxy objects representative of sub-data-blocks (a portion of the data block) from CPU memory to GPU memory occurs during the execution of a predecessor task. In order to schedule the tasks using the task-to-proxy-object scheduling technique, the task scheduling unit traverses a task dependency graph that is representative of the tasks that are to be executed by the GPU and the dependency of each task on predecessor tasks. The task scheduling unit then schedules the tasks and corresponding proxy objects based on the dependency relationship of the tasks ascertained from the task dependency graph and the data block requirements of each task. For example, when a task does not have a predecessor (that is, the task has no dependency on another task), the proxy objects for the task not having a predecessor are scheduled for immediate transfer to the compute units prior to the execution of the non-predecessor task. When a task does have a predecessor, the proxy objects representative of sub-data blocks required for the task's execution are scheduled for transfer during the predecessor task's execution, thereby overlapping memory transfers with task executions. The task scheduling unit is thus able to reduce the amount of time taken for memory transfers compared to non-overlapping memory transfer techniques, thereby improving the efficiency of the GPU.

Figure 1:
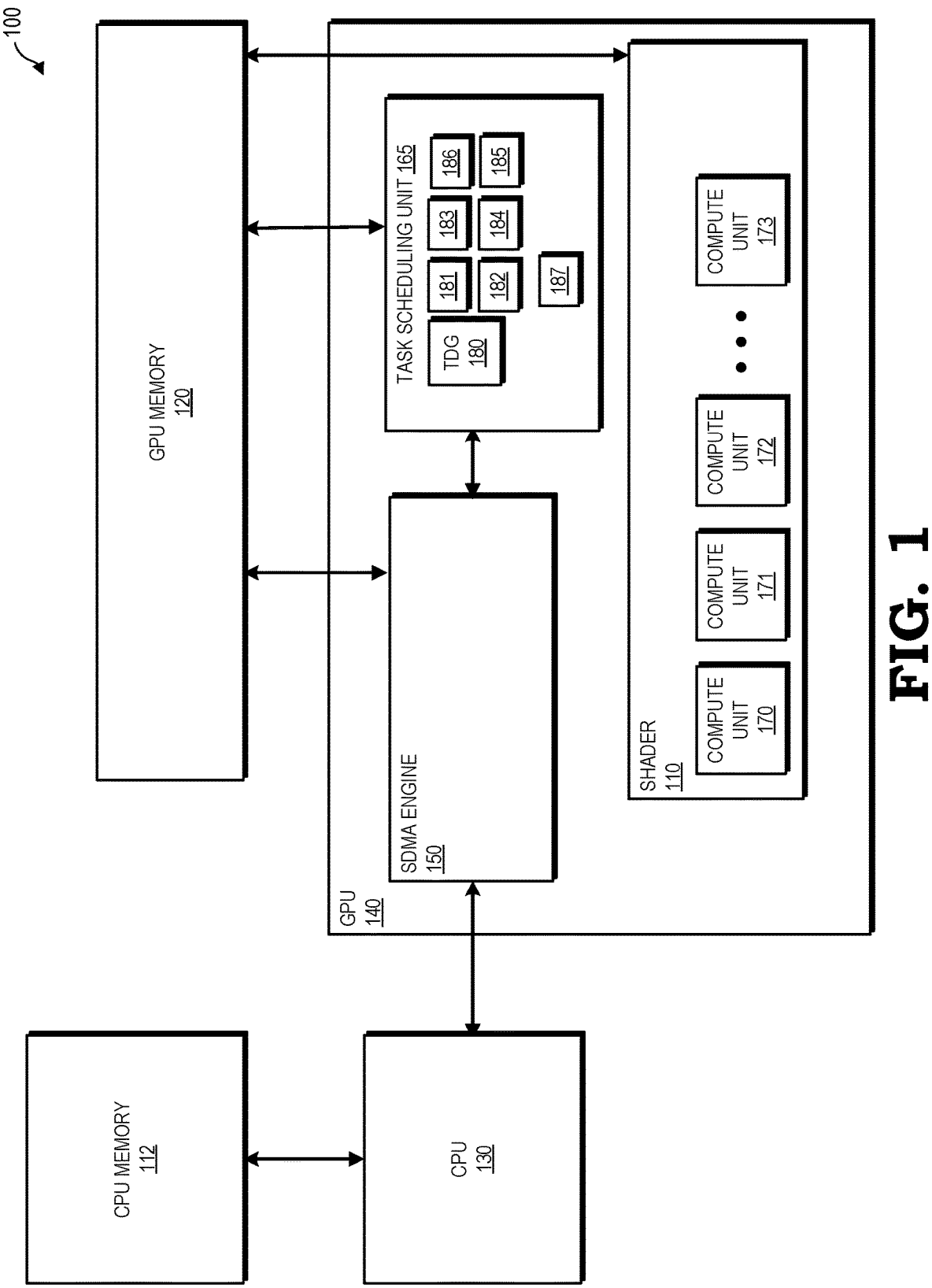
FIG. 1 is a block diagram of a processing system that implements task-to-proxy-object scheduling in accordance with some embodiments.

FIG. 1 illustrates a processing system 100 that performs asynchronous task and data block scheduling in accordance with some embodiments. Processing system 100 includes a CPU 130, a GPU 140, a GPU memory 120, and a CPU memory 112. GPU 140 includes a system direct memory access (SDMA) engine 150, and a shader 110. Shader 110 includes a compute unit 170, a compute unit 171, a compute unit 172, and a compute unit 173. In some embodiments, the shader 110 includes additional compute units not illustrated at FIG. 1. GPU 140 includes a task scheduling unit 165. In some embodiments, the GPU is another type of processor, such as a, vector processor, general-purpose GPU (GPGPUs), non-scalar processor, highly-parallel processor, artificial intelligence (AI) processor, inference engines, machine learning processor, other multithreaded processing unit, and the like. In some embodiments, GPU 140 includes a coprocessor (not shown), wherein asynchronous task and data block scheduling is implemented utilizing the coprocessor. In some embodiments, the coprocessor includes task scheduling unit 165. Task scheduling unit 165 includes a task dependency graph 180, a tasks-to-task-data-requirements mapping 181, a tasks-to-task-dependency mapping 182, a proxy-object-to-tasks mapping 183, a task-dispatch list 184, an execution-dispatch list 185, and a task-to-proxy-object schedule 186. In some embodiments, task-to-proxy object schedule 186 is a dynamic schedule or a static schedule. In some embodiments, task scheduling unit 165 is hardware or software (a software program or algorithm) executing on GPU 140. In some embodiments, task scheduling unit 165 is configured to utilize the task dependency graph 180, the tasks-to-task-data-requirements mapping 181, the tasks-to-task-dependency mapping 182, the proxy-object-to-tasks mapping 183, the task-dispatch list 184, and the execution-dispatch list 185 to schedule the plurality of tasks and corresponding data blocks for execution on compute units 170-173, as described further herein.

During operation of processing system 100, CPU 130 issues commands or instructions to GPU 140 to initiate data transfer and the scheduling of a plurality of tasks (or kernels) in a task dependency graph 180. In some embodiments, as is known in the art, a task is a unit of execution that represents program instructions that are to be executed by GPU 140. For example, in some embodiments, a task may be a thread or query of work to be executed by GPU 140. In some embodiments, the task dependency graph 180 is generated by the task scheduling unit 165 using tasks and task dependencies provided by CPU 130. In some embodiments, the plurality of tasks are represented as a task dependency graph 180, where each node of the graph represents a task and each edge connecting the nodes represents the dependency of each task on a subsequent or previous task. In some embodiments, the plurality of tasks of the task dependency graph 180 are to be executed according to single-instruction-multiple-data (SIMD) protocols such that each task of task dependency graph 180 has associated task data requirements (i.e., data blocks required for execution of each task). Each task of the task dependency graph 180 is executed on a single or multiple compute units of compute units 170-173. In some embodiments, the task dependency graph 180 is provided to task scheduling unit 165 from CPU 130 for scheduling of the plurality of tasks and the data blocks (or sub-data blocks) required for each task.

Task scheduling unit 165 receives the task dependency graph 180, and the task data requirements for each task in the task dependency graph 180 (i.e., the proxy objects that map to the sub-data blocks required by each task) from CPU 130. In some embodiments, the task data requirements provided by CPU 130 to the GPU 140 are specified in terms of a data read set and a data write set (read/write sets). The read/write sets are indicative of data blocks or sub-data blocks (a data block partitioned into subsets) required for each task of the tasks represented in the task dependency graph 180. In some embodiments, a compiler used to compile software programs in processing system 100 can reduce the read/write sets to data blocks (or sub-data blocks) that correspond to each task when, for example, the software programs operate on arrays of data provided from, for example, GPU memory 120 or CPU memory 112.

In some embodiments, the data blocks in each read/write set required by each task are represented by proxy objects. A proxy object is an object that contains information of a data block or sub-data block of a specific size, i.e., the start address and the end address of a data block or sub-data block. In some embodiments, a proxy object also contains list fields used by runtime to store the tasks that read from or write to the proxy object. In some embodiments, a proxy object is responsible for exactly one data block or sub-data block of a specific size such that no two proxy objects refer to the same data block and the data blocks of two proxy objects do not overlap.

In some embodiments, a software program provided by, for example, a programmer of processing system 100, specifies the tasks, the tasks inter-dependencies each task of the task dependency graph 180, the proxy objects, and the read/write sets using a library, such as a runtime framework and programming model for heterogeneous CPU-GPU systems. In some embodiments, the programmer specifies the proxy objects read or written by a task, while the runtime (executing on, for example, GPU 140) determines the dependencies between tasks using the read-set (i.e., proxy objects read by the task) and write-set (i.e., proxy objects written by the task) of each task. By intersecting the read and write sets with the tasks, task scheduling unit 165 is configured to compute the dependency edges between the tasks. An example of such an application programming interface (API) is the OpenMP's (Open Multi-Processing) depend clause, which is an opensource API that is used to build a series of task dependencies and supports multi-platform shared-memory multiprocessing programming in C, C++, and Fortran, on most platforms, instruction set architectures and operating systems, including, for example, Solaris, AIX, HP-UX, Linux, macOS, and Windows.

An example of a program provided by CPU 130 to GPU 140 specifying the read/write sets of each task is depicted in the pseudocode below:

```
proxyA[0] = make_proxy_obj(&A[0], &A[8]); // proxy for A[0:7]
proxyA[1] = make_proxy_obj(&A[8], &A[16]; // proxy for A[8:15]
proxyA[2] = make_proxy_obj(&A[16], &A[24]);
proxyA[3] = make_proxy_obj(&A[24], &A[32]);
proxyB = ...; // similar to proxyA
proxyC = ...; // similar to proxyA
task_1 = createTask(args...);
read(task_1, proxyA[0]);
write(task_1, proxyA[0]);
task_2 = createTask(args..
read(task_2, proxyA[0]);
write(task_2, proxyB[0]);
task_3 = createTask(args...);
read(task_3, proxyA[0]);
write(task_3, proxyB[1]);
... // repeat for other tasks
```

In the example pseudocode provided above, in some embodiments, the entire computation reads and updates a fixed number of data arrays or data blocks, in this case, data block A, B, C each having a total of thirty-two elements [0:31]. The proxy objects for a first data block A (e.g., a data block or array of 32 elements) are exemplified as proxyA[0], proxyA[1], proxyA[2], proxyA[3], the proxy objects for a second data block B (e.g., a data block or array of 32 elements) are exemplified as proxyB[0], proxyB[1], proxyB [2], proxyB[3], and the proxy objects for a third data block C (e.g., a data block or array of 32 elements) are exemplified as proxyC[0], proxyC[1], proxyC[2], proxyC[3].

For proxy object proxyA[0], the start address is A[0] and the end address is A[7]. For proxy object proxyA[1], the start address is A[8] and the end address is A[15]. For proxy object proxyA[2], the start address is A[16] and the end address is A[23]. For proxy object proxyA[3], the start address is A[24] and the end address is A[31]. In some embodiments, each task has a read set and a write set that is populated with proxy objects, e.g., TASK 1 has a proxyA[0] and a proxyA[0] as read and write sets respectively. In some embodiments, the read/write sets are defined in terms of specific tasks specified in task dependency graph 180 and proxy objects representative of specific sub-data blocks. For example, for a TASK 1, the read/write sets are read(task_1, proxyA[0]) and write(task_1, proxyA[0]). For a TASK 2, the read/write sets are read(task_2, proxyA[0]) and write (task_2, proxyB[0]). For a TASK 3, the read/write sets are read(task_3, proxyA[0]) and write(task_3, proxyB[1]). The pseudocode then repeats in defining the read/write sets for the remaining tasks in the task dependency graph 180. The task data requirements (read/write sets for each task) and the task dependency graph 180 are provided to task scheduling unit 165.

After receiving the task dependency graph 180 and task data requirements from CPU 130, task scheduling unit 165 traverses the task dependency graph 180, and maps the tasks and related task data requirements into tasks-to-task-data-requirements mapping 181 (described further in detail below with respect to FIG. 3), task-to-read/write set mapping 182 (described further in detail below with respect to FIG. 4) and a proxy-object-to-task mapping 183 (described further in detail below with respect to FIG. 5). Tasks-to-task-data-requirements mapping 181 is a mapping of the tasks of the task dependency graph 180 to the task data requirements associated with each task. The tasks-to-task-dependency mapping 182 is a mapping of the task dependency of the plurality of tasks represented in the task dependency graph 180 and the plurality of read-write sets associated with the plurality of tasks. The proxy-object-to-task mapping 183 is a mapping of the plurality of proxy objects to the plurality of tasks that access the proxy objects. Each of the mappings (tasks-to-task-data-requirements mapping 181, tasks-to-task-dependency mapping 182, and proxy-object-to-task mapping 183) are used by task scheduling unit 165 to schedule the tasks of task dependency graph 180 and the required sub-data blocks.

In order to schedule the initial task of task dependency graph 180 and the required proxy objects, task scheduling unit 165 determines which task or tasks of the plurality of tasks does not have a predecessor task and schedules the non-predecessor task as the initial task. In some embodiments, task scheduling unit 165 determines which task is the non-predecessor task by using the tasks-to-task-dependency mapping 182 to determine whether the number of predecessor tasks is nil or zero. A task whose number of predecessors is zero is the first task that is to be scheduled by task scheduling unit 165. Task scheduling unit 165 places the task to be scheduled for immediate execution in a task-dispatch list (described further in detail with reference to FIG. 6). Task scheduling unit 165 than determines the read/write sets required for the initial task by traversing the tasks-to-task-data-requirements mapping 181 which provides the proxy objects indicative of the sub-data blocks required for each task. Task scheduling unit 165 then schedules the transfer of the read/write sets for transfer prior to the execution of the initial task by generating the task-to-proxy-object schedule 186.

In order to schedule the tasks that are subsequent to the initial task (and similarly, all other subsequent tasks) of task dependency graph 180, task scheduling unit 165 determines which tasks are immediately dependent on the preceding task (referred to as the successor tasks of the initial task). In some embodiments, task scheduling unit 165 determines which tasks are immediately dependent on the preceding task by traversing the tasks-to-task-dependency mapping 182 and ascertaining the task dependency from the task dependency portion of tasks-to-task-dependency mapping 182. Task scheduling unit 165 determines the read/write sets required for the subsequent tasks by traversing the tasks-to-task-data-requirements mapping 181 and ascertaining the sub-data blocks required for the subsequent tasks. Task scheduling unit 165 schedules the successor tasks of the initial task for execution after receiving an interrupt from, for example, SDMA engine 150 or shader 150. That is, task scheduling unit 165 schedules the tasks and proxy objects based on an interrupt signal from SDMA engine 150 when, for example, data transfers are complete, or an interrupt signal from shader 150 when a task completes. In some embodiments, task scheduling unit 165 schedules the successor tasks of the initial task for execution after the execution of the initial task. In some embodiments, although not necessary for scheduling, the execution time is provided for in tasks-to-task-data-requirements mapping 181. Task scheduling unit 165 schedules the transfer of proxy objects that map to sub-data blocks (i.e., read/write sets) required for execution of the successor of the initial task for transfer during the execution of the preceding task (in this case, the initial task). Task scheduling unit 165 repeats the task scheduling process for each task of the task dependency graph 180 and the required proxy objects until there are no more remaining tasks and all proxy objects have been scheduled. That is, task scheduling unit 165 repeats this process until all tasks and read-write sets have been scheduled in task-to-proxy-object schedule 186.

In some embodiments, SDMA engine 150, which is configured to transfer data blocks from GPU memory 120 to shader 110, transfers the data blocks according to task-to-proxy-object schedule 186. That is, the tasks and read/write sets are dispatched from GPU memory 120 to shader 110 for execution by compute units 170-173 according to the task-to-proxy-object schedule 186 generated by task scheduling unit 165. Execution of the task-to-proxy-object scheduling technique utilized in FIG. 1 above is described further in detail with reference to the example depicted in FIGS. 2-7.

Figure 2A:
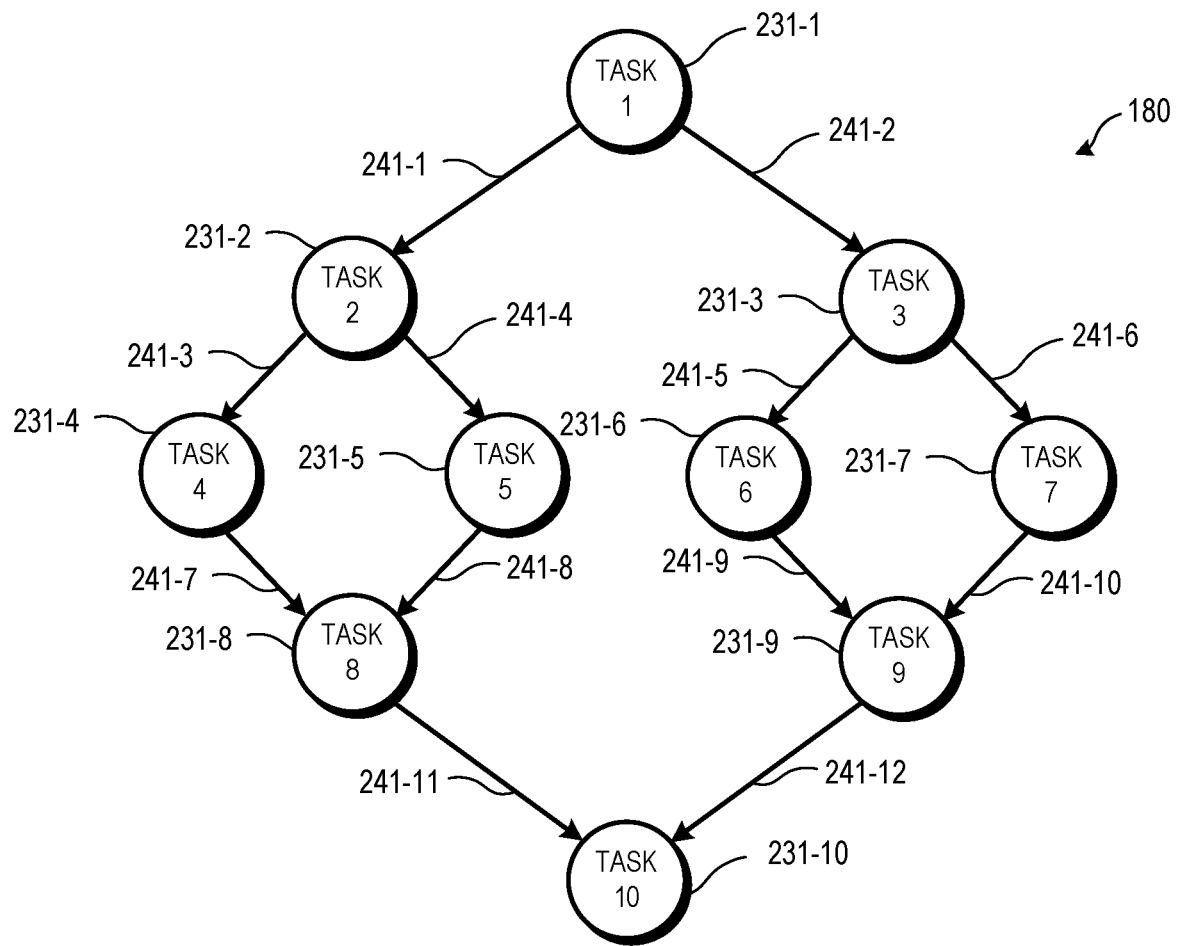
FIG. 2A is a task dependency graph used for task-to-proxy-object scheduling in the processing system of FIG. 1 in accordance with some embodiments.

FIG. 2A illustrates a task dependency graph 180 utilized to asynchronously schedule tasks and data blocks in the processing system 100 of FIG. 1 according to some embodiments. Task dependency graph 180 includes nodes 231-1-231-10, each representing a corresponding task, and edges 241-1-241-12. In various embodiments, as stated previously, task dependency graph 180 represents the tasks that a programmer of processing system 100 is attempting to execute on, for example, GPU 140. Each node or task 231-1-231-10 are kernel invocations, whereas edges 241-1-241-12 represent dependencies due to sharing of the data blocks that are to be executed by compute units 170-173. In one embodiment, for example, tasks 231-1-231-10 represent enumerated TASKS 1-10 and edge 241-3 indicates that TASK 4 shares at least a data block or sub-data block with TASK 2. The TASKS 1-10 of task dependency graph 180 map to the data blocks and the task data requirements described below with reference to FIG. 2B and FIG. 3.

Figure 2B:
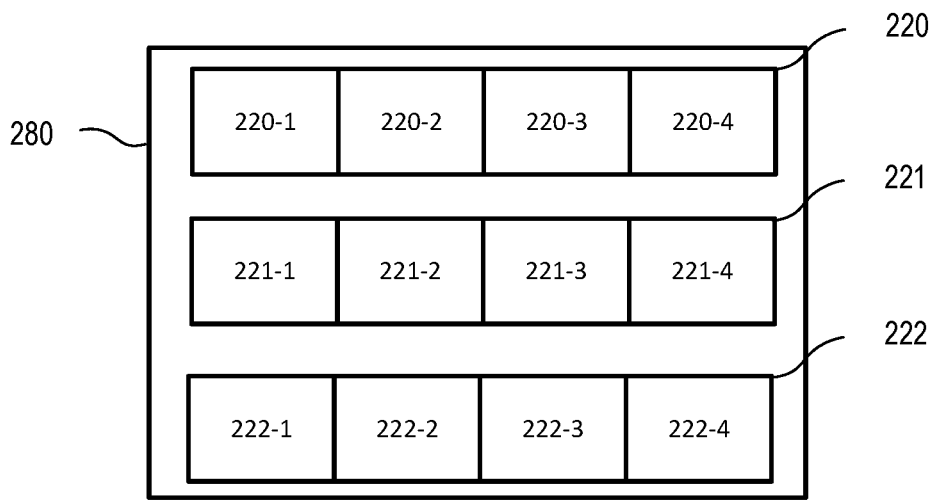
FIG. 2B is an illustration of task data blocks used for task-to-proxy-object scheduling in the processing system of FIG. 1 in accordance with some embodiments.

FIG. 2B illustrates task data blocks 280 used for task and data block scheduling in the processing system of FIG. 1 in accordance with some embodiments. Task data blocks 280 includes a data block 220, a data block 221, and a data block 222. Data block 220 includes a sub-data block 220-1, a sub-data block 220-2, a sub-data block 220-3, and a sub-data block 220-4. Data block 221 includes a sub-data block 221-1, a sub-data block 221-2, a sub-data block 221-3, and a sub-data block 221-4. Data block 222 includes a sub-data block 222-1, a sub-data block 222-2, a sub-data block 222-3, and a sub-data block 222-4. In some embodiments, data block 220, data block 221, and data block 222 are representative of blocks of data elements that are to be transferred to shader 110 for use by compute units 170-173 for execution of tasks 231-1-231-10. In some embodiments, there may be a greater or lesser number of data blocks in task data blocks 280 depending on, for example, the number of tasks or number of data blocks required for execution of the tasks by compute units 170-173.

For the example provided for illustration purposes in FIG. 2B, in some embodiments, data blocks 220, 221, and 222 map to data blocks A, B, C described with reference to FIG. 1, each data block having a total of thirty-two elements [0:31]. In some embodiments, sub-data block 220-1 represents sub-data block A[0:7]. Sub-data block 220-2 represents sub-data block A[8:15]. Sub-data block 220-3 represents sub-data block A[16:23]. Sub-data block 220-4 represents sub-data block A[24:31]. Sub-data block 221-1 represents sub-data block B[0:7]. Sub-data block 221-2 represents sub-data block B[8:15]. Sub-data block 221-3 represents sub-data block B[16:23]. Sub-data block 221-4 represents sub-data block B[24:31]. Sub-data block 222-1 represents sub-data block C[0:7]. Sub-data block 222-2 represents sub-data block C[8:15]. Sub-data block 222-3 represents sub-data block C[16:23]. Sub-data block 222-4 represents sub-data block C[24:31]. As described previously with respect to FIG. 1, each of the sub-data blocks are represented as proxy objects proxyA[0], proxyA[1], proxyA[2], and proxyA[3] for data block 220, proxyB[0], proxyB[1], proxyB[2], and proxyB[3] for data block 221, and proxyC[0], proxyC[1], proxyC[2], and proxyC[3] for data block 222. Further, each data block 220, 221, and 222 and corresponding sub-data blocks 220-1-220-4, 221-1-221-4, and 222-1-222-4, represent blocks of data elements that are required by tasks 231-231-10 and specified by the task data requirements provided to, for example, GPU 140 by CPU 130.

FIG. 3 illustrates a tasks-to-task-data-requirements mapping 181 that is used to schedule tasks and sub-data blocks in the processing system of FIG. 1 according to some embodiments. Tasks-to-task-data-requirements mapping 181 includes a task ID 310 column, an execution time 320 column, and a task data requirements 330 column. Task ID 310 is an identification number given to each task that represents the tasks 231-1-231-10 depicted in task dependency graph 180. Execution time 320 is the total execution time that each task requires to execute provided by, for example, CPU 130. First data block column 331, second data block column 332, and third data block column 333 of tasks data requirements 330 each represent the data blocks that are required for the corresponding task in tasks 231-1-232-10. In some embodiments, the task data requirements 330 and the execution times 320 are provided by, for example, a programmer that specifies the tasks and the data blocks required in GPU memory 120 before the task is dispatched for execution in shader 110. In some embodiments, the task data requirements 330 and execution times 320 are provided using a library that includes, for example, a runtime framework and programming model for heterogeneous CPU and GPU systems.

For the example depicted in FIG. 3, TASK 1 has a task ID of 1 and has an execution time of four seconds and requires sub-data block A[0:7] in order to execute. TASK 2 has a task ID of 2, an execution time of six seconds, and requires sub-data blocks A[0:7] and B[0:7] in order to execute. TASK 3 has a task ID of 3, an execution time of six seconds, and requires sub-data blocks A[0:7] and B[8:15] in order to execute. TASK 4 has a task ID of 4, an execution time of three seconds, and requires sub-data blocks A[0:7], B[0:7], and C[0:7] in order to execute. TASK 5 has a task ID of 5, an execution time of one second, and requires sub-data blocks A[0:7], B[0:7], and C[8:15] in order to execute. TASK 6 has a task ID of 6, an execution time of three seconds, and requires sub-data blocks A[0:7], B[8:15], and C[16:23] in order to execute. TASK 7 has a task ID of 7, an execution time of one second, and requires data blocks A[0:7], B[8:15], and C[24:31] in order to execute. TASK 8 has a task ID of 8, an execution time of eight seconds, and requires data blocks A[8:15], B[16:23], and C[0:7] in order to execute. TASK 9 has a task ID of 9, an execution time of eight seconds, and requires sub-data blocks A[8:15], B[24:31], and C[8:15] in order to execute. TASK 10 has a task ID of 10, an execution time of ten seconds, and requires sub-data blocks A[16:31], B[24:31], and C[24:31] in order to execute.

Figure 4:
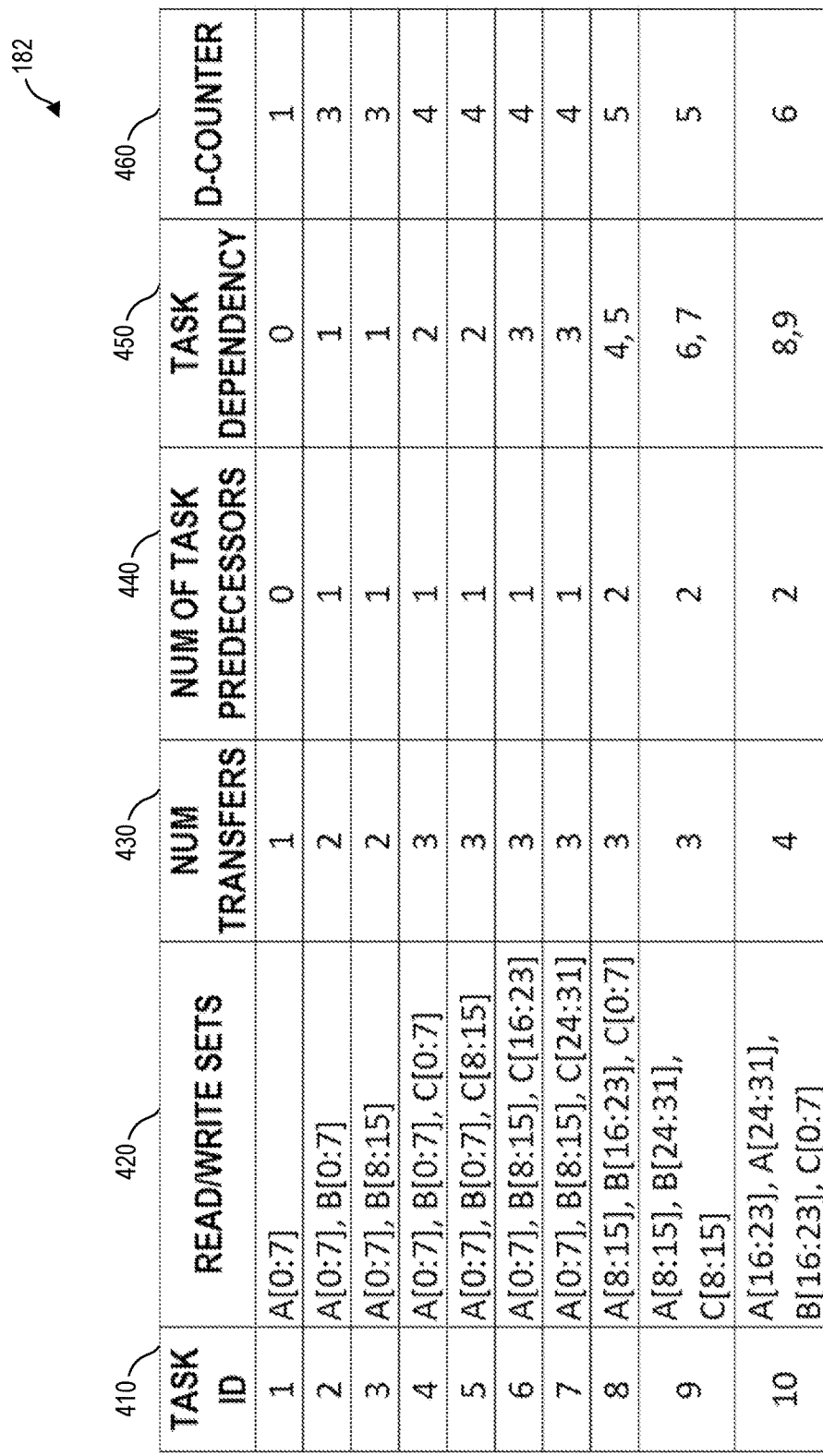
FIG. 4 is a tasks-to-read/write sets mapping used for task-to-proxy-object scheduling in the processing system of FIG. 1 in accordance with some embodiments.

FIG. 4 illustrates a task-to-read/write set mapping 182 in accordance with some embodiments. Task-to-read/write set mapping 182 includes a task ID column 410, a read/write sets column 420 (read/write sets 420), a number of sub-data block transfers (num transfers column 430), a number of task predecessors column 440 (num of task predecessors 440), a task dependency column 450, and a D-counter 460.

Task ID of task ID column 410 is the identification number assigned to each task of task dependency graph 180. Num transfers 430 is the number sub-data blocks required by the task that are to be transferred to shader 110. Num of task predecessors 440 is the number of task predecessors of a task. D-counter 460 is an atomic counter whose value is equal to the number of transfers 430 plus the number of task predecessors 440. GPU 140 calculates the value of the counter in D-counter 460 by adding number of sub-data block transfers (num transfers 430) to the number of task predecessors (num of task predecessors 440).

In order to populate task-to-read/write set mapping 182, task scheduling unit 165 commences by traversing task dependency graph 180 and determining the task dependency of each task, i.e., mapping the task dependency of each task into the task dependency column 450 of task-to-read/write set mapping 182 depicted in FIG. 4. For example, traversing task dependency graph 180 depicted in FIG. 2, task scheduling unit 165 determines that TASK 1 is not dependent on any tasks and is the predecessor of TASK 2 and TASK 3. TASK 2 is dependent on or the successor of TASK 1 and is the predecessor of TASK 4 and TASK 5. TASK 3 is the successor of TASK 1 and the predecessor of TASK 6 and TASK 7. TASK 4 is the successor of TASK 2 and the predecessor of TASK 8. TASK 5 is the successor of TASK 2 and the predecessor of TASK 8. TASK 6 is the successor of TASK 3 and the predecessor of TASK 9. TASK 7 is the successor of TASK 3 and the predecessor of TASK 9. TASK 8 is the successor of TASK 4 and TASK 5 and the predecessor of TASK 10. TASK 9 is the successor of TASK 6 and TASK 7 and the predecessor of TASK 10. TASK 10 is the successor of TASK 8 and TASK 9. GPU 140 places the task dependencies in the task dependency column 450 of the tasks-to-task-dependency mapping 182.

In addition to traversing task dependency graph 180 to determine the task dependencies placed in task dependency column 450, GPU 140 traverses task dependency graph 180 to ascertain the number of predecessors of each task 231-1-231-10, as well as the required task sub-data blocks provided in the read/write sets and the number of sub-data block transfers, and maps each to each task represented by task ID of task ID column 410. From the read/write sets 420, the task dependency 450, and num of task predecessors 440, task scheduling unit 165 determines the number of sub-data block transfers required (num transfers 430) as well as the value of the D-counter 460 (e.g., number of sub-data block transfers plus the number of task predecessors).

For the tasks depicted in task dependency graph 180, task scheduling unit 165 determines that TASK 1 does not have a predecessor (i.e., number of task predecessors 460 is 0) and requires a single sub-data block (i.e., A[0:7]) in the read/write sets 420). Thus, the number of sub-data block transfers (num transfers 430) is 1 and the D-counter 460 value is 1. Task scheduling unit 165 determines that TASK 2 has a single predecessor (i.e., num of task predecessors 440 is 1) and requires two proxy objects, i.e., A[0:7] and B[0:7] in the read/write sets 420), and thus the number of sub-data block transfers (num of transfers 430) is 2 and the D-counter 460 is 3. TASK 3 has a single predecessor (i.e., num of task predecessors 440 is 1) and requires two proxy objects, i.e., A[0:7] and B[8:15] in the read/write sets 420), and thus num transfers 430 is 2 and the D-counter 460 is 3. TASK 4 has a single predecessor (i.e., num of task predecessors 440 is 1) and requires three proxy objects, i.e., A[0:7], B[0:7], and C[0:7] in the read/write sets 420), and thus num transfers 430 is 3 and the D-counter 460 is 4.

TASK 5 has a single predecessor (i.e., num of task predecessors 440 is 1) and requires three proxy objects, i.e., A[0:7], B[0:7], and C[8:15] in the read/write sets 420), and thus num transfers 430 is 3 and the D-counter 460 is 4. Task 6 has a single predecessor (i.e., num of task predecessors 440 is 1) and requires three proxy objects, i.e., A[0:7], B[8:15], and C[16:23] in the read/write sets 420), and thus num transfers 430 is 3 and the D-counter 460 is 4. TASK 7 has a single predecessor (i.e., num of task predecessors 440 is 1) and requires three proxy objects, i.e., A[0:7], B[8:15], and C[24:31] in the read/write sets 420), and thus num transfers 430 is 3 and the D-counter 460 is 4. TASK 8 has a two predecessors (i.e., num of task predecessors 440 is 2) and requires three proxy objects, i.e., A[8:15], B[16:23], and C[0:7] in the read/write sets 420), and thus num transfers 430 is 3 and the D-counter 460 is 5.

TASK 9 has a two predecessors (i.e., num of task predecessors 440 is 2) and requires three proxy objects, i.e., A[8:15], B[24:31], and C[8:15] in the read/write sets 420), and thus num transfers 430 is 3 and the D-counter 460 is 5. TASK 10 has two predecessors (i.e., num of task predecessors 440 is 2) and requires four proxy objects, i.e., A[16:23], A[24:31], B[16:23], and C[0:7] in the read/write sets 420), and thus num transfers 430 is 4 and the D-counter 460 is 6. Task scheduling unit 165 utilizes the results of the task-to-read/write set mapping 182, and the task data requirements and execution times provided in tasks-to-task-data-requirements mapping 181 of FIG. 3 to schedule the plurality of tasks 231-1-231-10 and sub-data blocks of read/write sets 420.

Figure 5:
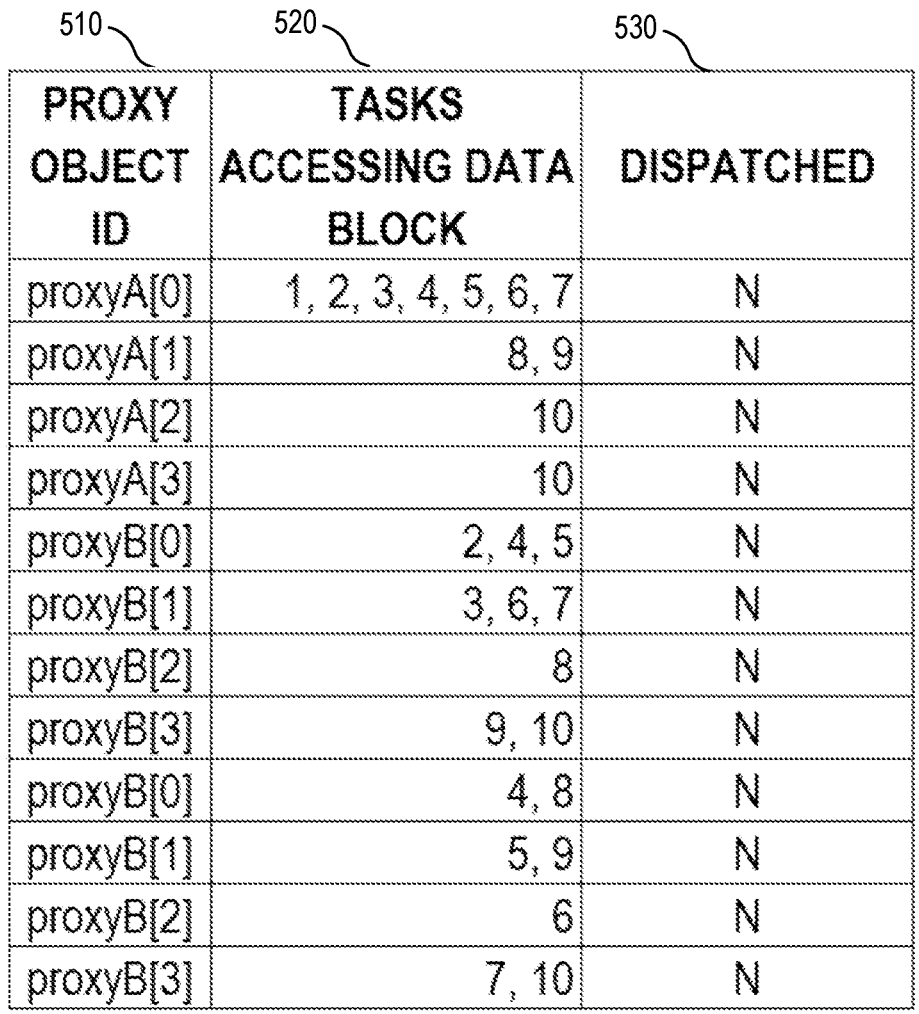
FIG. 5 is a proxy-object-to-tasks mapping used for task-to-proxy-object scheduling in the processing system of FIG. 1 in accordance with some embodiments.

FIG. 5 illustrates a proxy-object-to-tasks mapping 183 utilized in the processing system of FIG. 1 in accordance with some embodiments. Proxy-object-to-tasks mapping 183 is a mapping of the proxy objects to the plurality of tasks of task dependency graph 180 accessing the proxy objects. Proxy-object-to-tasks mapping 183 includes a proxy object ID column 510 representative of the proxy object that maps to the corresponding sub-data block, a tasks accessing data block column 520 representative of the tasks accessing the sub-data blocks represented in the proxy object ID column 510, and a dispatched column 530 that serves as a flag or indicator of whether the transfer of the proxy object in the proxy object ID column 510 has been scheduled on SDMA engine 150.

The tasks accessing data block column 520 is populated during the scheduling phase of the tasks 231-1-231-10. Task scheduling unit 165 determines which tasks of task dependency graph 180 access the sub-data blocks represented by the proxy objects represented in proxy object ID column 510 by checking task data requirements 330 of the tasks-to-task-data-requirements mapping 181 to determine which tasks map to the TASK ID indicated by task ID 310. Task scheduling unit 165 places the tasks that access each sub-data block in the tasks access data block column 520.

The dispatched column 530 is populated during the scheduling phase of the tasks 231-231-10. Prior to the scheduling of the initial task scheduled by the task scheduling unit 165, all sub-data blocks have not been scheduled for transfer to SDMA engine 150, as indicated by the default value N. When a sub-data block represented by the proxy-object ID in 510 has been scheduled for transfer to SDMA engine 150, the default value N in dispatched column 530 is populated with the value Y, indicative of the sub-data blocks corresponding to the proxy objects of proxy object ID column 510 having been scheduled for transfer. As a result, at any point during the scheduling process of tasks 231-1-231-10 and the proxy objects, task scheduling unit 165 is privy to whether a specific sub-data block required by a task for execution has been scheduled for transfer to SDMA engine 150.

Figure 6:
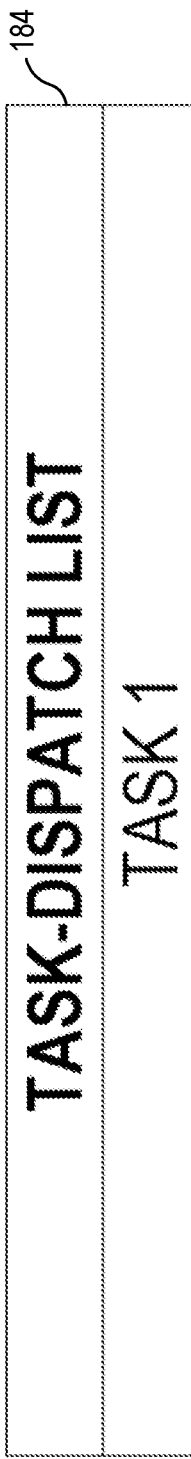
FIG. 6 is a task-dispatch list used for task-to-proxy-object scheduling in the processing system of FIG. 1 in accordance with some embodiments.

FIG. 6 illustrates a task-dispatch list 184 that is generated by task scheduling unit 165 of FIG. 1 in accordance with some embodiments. Task-dispatch list 184 is a list that contains the immediate subsequent task or tasks for which GPU 140 is to next initiate data transfers (i.e., tasks whose data transfers occur next in the task dependency graph 180). Initially, for the example illustrated in FIG. 2, since TASK 1 is the task whose data transfers occur first (the task with no predecessors), TASK 1 is placed in task-dispatch list 184. After the initial task (i.e., TASK 1) and the corresponding sub-data blocks have been scheduled for transfer, the task is removed and the tasks that are next in line for sub-data block transfer, i.e., TASK 2 and TASK 3, are placed in the task-dispatch list 184. The process of placing the subsequent task or tasks whose data transfers are next to occur occurs until all the data transfers have occurred.

Figure 7:
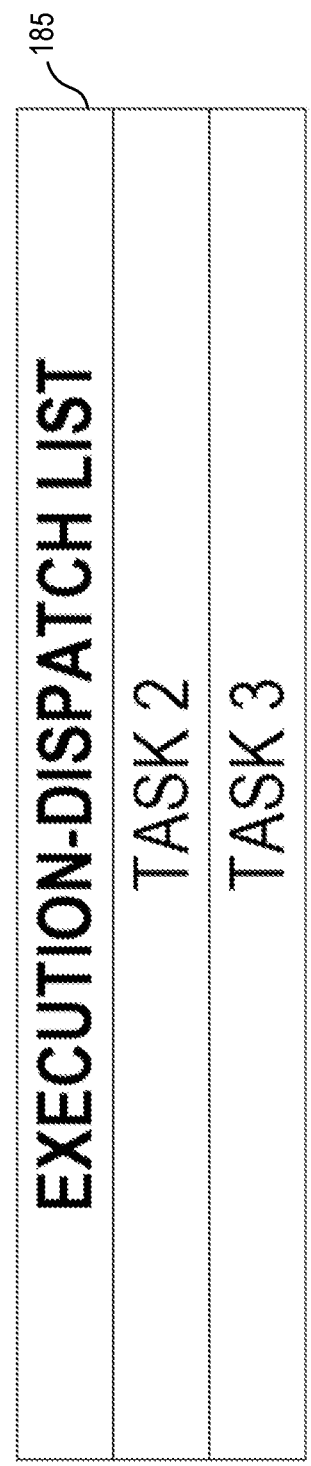
FIG. 7 is an execution-dispatch list used for task-to-proxy-object scheduling in the processing system of FIG. 1 in accordance with some embodiments.

FIG. 7 illustrates an execution-dispatch list 185 generated by task scheduling unit 165 of FIG. 1 in accordance with some embodiments. Execution-dispatch list 185 includes the tasks of task dependency graph 180 that are ready to be dispatched for execution by compute units 170-173 of shader 110. Execution-dispatch list 185 is populated with the tasks of tasks-to-task-dependency mapping 182 whose D-counter value in D-counter column 460 is zero, which is indicative of the tasks that are next in line to be executed by compute units 170-173. For the example illustrated in FIG. 7, TASK 2 and TASK 3 are the tasks that are next in line to be executed by compute units 170-173. In various embodiments, execution-dispatch list 185 may be implemented using, for example, a heterogeneous system architecture (HSA) queue as is known in the art.

Figure 8:
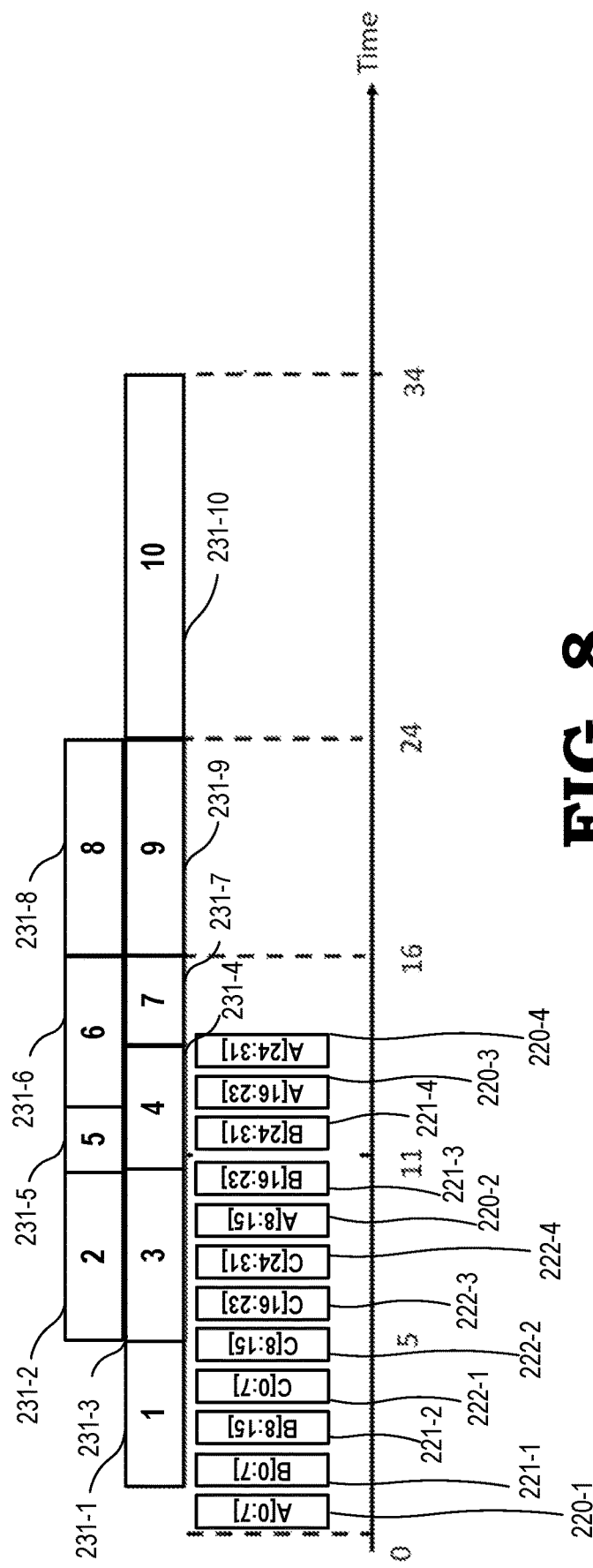
FIG. 8 is a tasks-to-data block schedule generated using the processing system of FIG. 1 in accordance with some embodiments.

FIG. 8 illustrates a task-to-proxy-object schedule 186 generated by task scheduling unit 165 of FIG. 1 in accordance with some embodiments. In order to generate the task-to-proxy-object schedule 186, GPU 140 receives the task dependency graph 180 and task data requirements from CPU 130. Task scheduling unit 165 traverses the task dependency graph 180 which populates and initializes the tasks-to-task-data-requirements mapping 181, the tasks-to-task-dependency mapping 182, the proxy-object-to-tasks mapping 183, the task-dispatch list 184, and the execution-dispatch list 185. As stated previously, GPU 140 traverses task dependency graph 180 in order to determine which tasks of the plurality of tasks do not have a predecessor task. GPU 140 places the tasks that do not have a predecessor task in task-dispatch list 184. For example, for the embodiment illustrated in FIG. 2, task scheduling unit 165 traverses task dependency graph 180 and determines that TASK 1 does not have a predecessor task. GPU 140 places TASK 1 as the initial task to be scheduled in task-dispatch list 184.

After populating the task-dispatch list 184 with the initial TASK 1, GPU 140 removes the task (e.g., TASK 1) from task-dispatch list 184 and schedules the task and all the proxy object transfers (mapping to the corresponding sub-data blocks) required for the task, in this case, sub-data block 220-1, depicted in FIG. 8. As depicted in task-to-proxy-object schedule 186, sub-data block 220-1 is scheduled for transfer prior to the execution of TASK 1. GPU 140 does not schedule the subsequent tasks until all proxy object transfers for the current task have been scheduled by task scheduling unit 165.

In some embodiments, when all data-transfers for the removed task have been scheduled by task scheduling unit 165, GPU 140 adds the successor tasks of the predecessor task to the task-dispatch list 184. That is, the task's successors (TASK 2 and TASK 3) in the task dependency graph 180 are added to the task-dispatch list 184. GPU 140 then schedules the proxy object transfers for the successor tasks that have not already been scheduled for transfer to occur during the execution of the preceding task (e.g., TASK 1). In some embodiments, task scheduling unit 165 repeatedly removes tasks from task-dispatch list 184 for the subsequent tasks and schedules all of the tasks proxy object transfers on the SDMA engine 150 until either all the data transfers have been scheduled or the SDMA engine 150 has been fully loaded with the scheduled data transfers. In the case where the SDMA engine 150 has been fully loaded, GPU 140 does not process a new task from task-dispatch list 184 until all the transfers for a previous task have been scheduled.

Upon completion of the scheduling of the proxy objects of each task, the GPU 140 marks a flag in the dispatched column 530 of the proxy-object-to-task mapping 500 for each proxy object corresponding to the proxy object (i.e., the corresponding sub-data block) whose transfer has been scheduled on the SDMA engines 150.

In some embodiments, after the task scheduling unit 165 has scheduled the initial proxy object transfer (e.g., mapping to sub-data block 220-1), the initial task (e.g., TASK 1), and the sub-data blocks (e.g., sub-data block 220-1, sub-data block 221-1, sub-data block 221-2) that are required for the subsequent tasks (e.g., TASK 2 and TASK 3), SDMA engine 150 performs the data transfer required for the scheduled tasks. When the SDMA engine 150 completes a data transfer, the SDMA engine 150 interrupts, for example, a coprocessor (not shown), with the proxy object ID associated with the sub-data block transferred in the interrupt payload. In some embodiments, when a sub-data block of a task has been transferred, task scheduling unit 165 decrements the D-counter value in D-counter column 460 of all the tasks that require the sub-data block. In some embodiments, an interrupt handling routine executed on GPU 140 atomically decrements the D-counter value in D-counter column 460 of all the tasks that require the sub-data block by using the tasks accessing data block column 520 of proxy-object-to-tasks mapping 183.

In some embodiments, when task scheduling unit 165 determines that the D-counter value in D-counter column 460 of a task reached zero, GPU 140 places the task in the execution-dispatch list 185 of FIG. 7, which, as stated previously, includes the tasks of task dependency graph 180 that are ready to be dispatched for execution by compute units 170-173. SDMA engine 150 repeatedly removes the tasks from the execution-dispatch list 185 and dispatches the tasks for execution to shader 110 for execution by compute units 170-173. In some embodiments, as stated previously, when a task completes execution on compute units 170-173 of shader 110, the task generates an interrupt that is provided to, for example, a coprocessor (not shown) that is interrupted with the task ID of the completed task in the payload of the interrupt.

Thus, in some embodiments, GPU 140 initially moves the tasks of task dependency graph 180 into task-dispatch list 184 to schedule the tasks' required data transfers. Once the data transfers of a task and the task's dependencies due to predecessors have been resolved, the corresponding D-counter value in D-counter column 460 reaches zero and the GPU 140 moves the task into execution-dispatch list 185. As illustrated in FIGS. 1-8 above, scheduling of both data transfers and task-execution occurs asynchronously while ensuring that dependencies due to both the data transfers and predecessor tasks in the task dependency graph 180 are respected.

Figure 9:
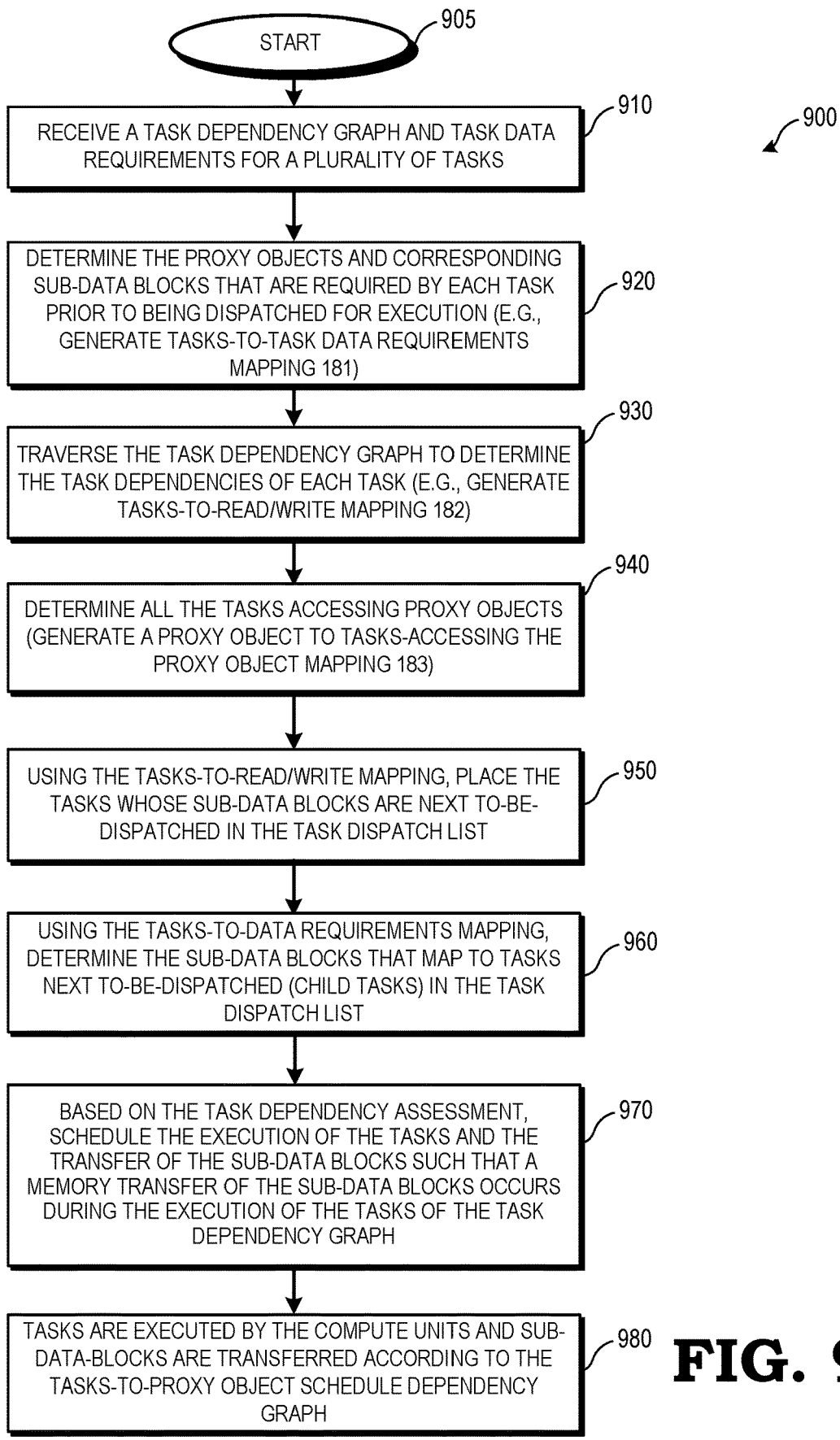
FIG. 9 is a flow diagram illustrating a method for performing task-to-proxy-object scheduling in the processing system of FIG. 1 in accordance with some embodiments.

FIG. 9 illustrates a method 900 for performing task-to-proxy-object scheduling in the processing system of FIG. 1 in accordance with some embodiments. Method 900 commences at start block 905. At block 910, GPU 140 receives a task dependency graph 180 and task data requirements corresponding to the plurality of tasks of task dependency graph 180. At block 920, task scheduling unit 165 generates tasks-to-task-data-requirements mapping 181 and determines which proxy objects and corresponding sub-data blocks that are required by each task prior to being dispatched for execution by compute units 170-173. At block 930, task scheduling unit 165 traverses the task dependency graph 180 to determine the task dependences of each task (task dependency 450), along with the number of predecessors of each task (number of task predecessors 440), the number of sub-data block transfers required of each task (num transfers 430), the read-write sets required by each task (read/write sets 420), and the number sub-data block transfers added to the number of predecessors of each task (D-counter 460) to generate tasks-to-task-dependency mapping 182. At block 940, task scheduling unit 165 determines all the tasks accessing proxy objects. That is, task scheduling unit 165 generates proxy-object-to-task mapping 183 that indicates all the proxy objects (proxy object ID 510) used by the tasks of task dependency graph 180, the tasks that access each proxy object (tasks accessing data block 520) and a flag (dispatched 530) that indicates whether the transfer of the proxy object (i.e., corresponding sub-data block) has been scheduled for transfer. At block 950, task scheduling unit 165 uses the task-to-read/write mapping 182 to place the tasks whose sub-data blocks are next to be dispatched in task-dispatch list 184. At block 960, based on the task dependency assessment conducted in the previous blocks (e.g., blocks 920-960), task scheduling unit 165 schedules the execution the tasks and the transfer of the sub-data blocks such that the memory transfer of the sub-data blocks occurs during the execution of the tasks of the task dependency graph 180. At block 980, the tasks are executed by compute units 170-173 and the sub-data-blocks are transferred from CPU memory 112 to GPU memory 120 according to the tasks-to-proxy-object schedule.

In some embodiments, tasks that have been placed in the task-dispatch list 184 are prioritized based on various criticality metrics, such as, for example, the height of a node in the task dependency graph 180, the height of a node in the task dependency graph 180. In some embodiments, heuristics, such as depth, height or other metrics, are used because determining, for example, the most critical task in a directed-acyclic task graph, such as the task dependency graph, can be determined to be NP-complete, where no polynomial time algorithms are known for the general case.

In some embodiments, task scheduling unit 165 schedules the tasks in the task dependency graph 180 by task dependency graph order. In the task dependency graph order approach, the task scheduling unit 165 prioritizes tasks by the order of the tasks in the task dependency graph 180, which can be, for example, a topological order on the task dependency graph. In some embodiments, the goal in the task dependency graph order approach is to prioritize the data-transfers of tasks that are likely to be scheduled for execution first because the tasks are elevated in the graph. In some embodiments, the task dependency graph order approach is implemented by processing the task-dispatch list 184 and the execution-dispatch list a85 in first-in-first-out (FIFO) order.

In some embodiments, task scheduling unit 165 schedules the tasks of task dependency graph 180 using a task-by-data-size order approach. In the task-by-data size approach, task scheduling unit 165 orders the task-dispatch list by the size of data-transfers needed by each task. In one embodiment, when tasks are processed in increasing order of the size of data transfers (data transfer size), more tasks are enabled for execution. In another embodiment, when tasks are processed in decreasing order of transfer size, the efficiency of SDMA engine 150 is improved by scheduling larger sized transfers at the beginning of the computation when, for example, fewer kernels are executing.

In some embodiments, task scheduling unit 165 schedules the tasks of task dependency graph 180 using a schedule by data-reuse. In the schedule by-reuse approach, the task-dispatch list 184 is prioritized by selecting tasks whose data-blocks are used most by other tasks, i.e., the priority metric is a function of the number of tasks that access the data blocks. In the schedule by data-reuse, the goal is to prioritize the transfers for the most used data-blocks.

In some embodiments, the proxy objects include a data-block's CPU pointer, a GPU pointer, and the size of the data-block or sub-data-block. In some embodiments, when, for example, a task is drawn from task-dispatch list 184 (i.e., the list of tasks whose SDMA requests have not yet issued), an SDMA packet is placed into an SDMA queue (not shown) that is either in CPU 112 or GPU memory 120. The SDMA packet includes a source pointer, a destination pointer, a size of the data-block, and a proxy object ID, where the source pointer and destination pointer point to data-blocks in GPU memory 120 or CPU memory 112. The SDMA engine 150 consumes the SDMA packets from the SDMA queue and carries out the copy operation indicated by each packet. In some embodiments, for example, a coprocessor can immediately return to other work after putting an SDMA packet in the SDMA queue. In some embodiments, a coprocessor may have to wait if the SDMA queue fills up to its maximum capacity. In some embodiments, the SDMA engine 150, upon completing a data transfer, interrupts coprocessor 160 with the proxy object ID in the SDMA packet sent via the SDMA queue.

In some embodiments, the apparatus and techniques described above are implemented in a system including one or more integrated circuit (IC) devices (also referred to as integrated circuit packages or microchips), such as the GPU described above with reference to FIGS. 1-9. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method implemented in a processor, comprising:
performing a task dependency assessment of a task dependency graph representative of a plurality of tasks and task data requirements that correspond to each task of the plurality of tasks;
based on the task dependency assessment, generating an asynchronous schedule for a task, the schedule providing for transfer of proxy objects required for the task to a graphics processing unit memory during execution of a preceding task; and
transferring data associated with the proxy objects to the graphics processing unit memory based on the schedule.

2. The method of claim 1, wherein:
the task dependency assessment reveals a task dependency of each task in the plurality of tasks and a set of proxy objects that are required for each task to execute.

3. The method of claim 2, wherein:
the task is a successor task and the preceding task is a predecessor task.

4. The method of claim 1, wherein:
the task dependency assessment indicates a task dependency of each task in the plurality of tasks and a set of proxy objects that are required for each task to execute.

5. The method of claim 4, further comprising:
using the task dependency of each task in the plurality of tasks to schedule the plurality of tasks such that a memory transfer of proxy objects representative of data-blocks from a central processing unit (CPU) memory to a graphics processing unit (GPU) memory occurs during the execution of a predecessor task.

6. The method of claim 1, further comprising:
generating a first mapping of the plurality of tasks represented in the task dependency graph to a plurality of data blocks required for each task of the plurality of tasks.

7. The method of claim 6, further comprising:
using the first mapping to schedule a plurality of proxy objects required for each task of the plurality of tasks according to a first order of the proxy objects in the first mapping.

8. The method of claim 7, further comprising:
generating a second mapping of the plurality of tasks represented in the task dependency graph to a task dependency of each task and a total number of predecessors of each task.

9. The method of claim 8, further comprising:
using the second mapping of the plurality of tasks represented in the task dependency graph to schedule the plurality of tasks such that each successor task of the plurality of tasks is scheduled after a corresponding predecessor task.

10. The method of claim 9, further comprising:
generating a third mapping of a plurality of proxy objects to a plurality of tasks that access the plurality of data blocks.

11. The method of claim 10, further comprising:
using the third mapping of the plurality of tasks represented in the task dependency graph to schedule the plurality of tasks and the plurality of data blocks.

12. The method of claim 1, further comprising:
generating a task-dispatch list that includes a first task of the plurality of tasks to be scheduled, the plurality of tasks being placed in the task-dispatch list based on an execution order; and
scheduling the plurality of tasks and a plurality of data blocks based on the execution order of the task-dispatch list.

13. A processing system including at least one processor, comprising:
task scheduling circuitry; and
a system direct memory access (SDMA) engine coupled to the task scheduling unit, wherein the task scheduling unit:
performs a task dependency assessment of a task dependency graph and task data requirements that correspond to each task of a plurality of tasks of the task dependency graph; and
based on the task dependency assessment, generates an asynchronous schedule for a task, the schedule providing for transfer of proxy objects required for the task to a graphics processing unit memory during execution of a preceding task; and
the SDMA engine transfers data associated with the proxy objects to the graphics processing unit memory based on the schedule.

14. The processing system of claim 13, wherein:
the task dependency assessment reveals a task dependency of each task in the plurality of tasks and which plurality of data blocks of the plurality of data blocks are required for each task to execute.

15. The processing system of claim 14, wherein:
the task dependency of each task in the plurality of tasks is used to schedule the plurality of tasks such that a memory transfer of proxy objects representative of data-blocks from a central processing unit (CPU) memory to a graphics processing unit (GPU) memory occurs during the execution of a predecessor task.

16. The processing system of claim 15, further comprising:
a task scheduling unit that generates a first mapping of the plurality of tasks represented in the task dependency graph to a plurality of data blocks required for each task of the plurality of tasks.

17. The processing system of claim 16, wherein:
the first mapping is used to schedule the plurality of data blocks required for each task of the plurality of tasks according to a first order of the data blocks in the first mapping.

18. The processing system of claim 17, wherein:
the task scheduling unit generates a second mapping of the plurality of tasks represented in the task dependency graph to the task dependency of each task and a total number of predecessors of each task.

19. The processing system of claim 18, wherein:
the second mapping of the plurality of tasks represented in the task dependency graph is used to schedule the plurality of tasks such that each successor task of the plurality of tasks is scheduled after a corresponding predecessor task.

20. The processing system of claim 13, wherein a proxy object is an object that contains information of a data block of a specific size.

\* \* \* \* \*